(12) United States Patent
Hua et al.

(10) Patent No.: US 11,006,317 B2
(45) Date of Patent: May 11, 2021

(54) COMMUNICATION METHOD AND APPARATUS

(71) Applicant: HUAWEI TECHNOLOGIES CO., LTD., Guangdong (CN)

(72) Inventors: Yao Hua, Shenzhen (CN); Bingzhao Li, Beijing (CN); Zhenzhen Cao, Beijing (CN); Xiao Xiao, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/188,735

(22) Filed: Nov. 13, 2018

(65) Prior Publication Data

US 2019/0082352 A1 Mar. 14, 2019

Related U.S. Application Data

(63) Continuation of application No. PCT/CN2016/082067, filed on May 13, 2016.

(51) Int. Cl.
*H04W 72/10* (2009.01)
*H04L 12/26* (2006.01)
(Continued)

(52) U.S. Cl.
CPC ............ *H04W 28/06* (2013.01); *H04W 4/46* (2018.02); *H04W 8/24* (2013.01); *H04W 24/10* (2013.01);
(Continued)

(58) Field of Classification Search
CPC ....... H04W 28/06; H04W 24/10; H04W 4/46; H04W 72/0453; H04W 72/048;
(Continued)

(56) References Cited

U.S. PATENT DOCUMENTS 10,149,120 B2 * 12/2018 Sachs ................ H04L 5/001
2011/0026422 A1 * 2/2011 Ma .................... H04W 72/0453
370/252
(Continued)

FOREIGN PATENT DOCUMENTS

CN 101873648 A 10/2010
CN 102474758 A 5/2012
(Continued)

OTHER PUBLICATIONS

International Search Report dated Jan. 26, 2017 in corresponding International Application No. PCT/CN2016/082067.
(Continued)

*Primary Examiner* — Edan Orgad
*Assistant Examiner* — Vanneilian Lalchinthang
(74) *Attorney, Agent, or Firm* — Womble Bond Dickinson (US) LLP

(57) ABSTRACT

A communication method and an apparatus are provided to improve communications efficiency. The communication method includes: receiving, by a base station, carrier aggregation capability information from UE; receiving, by the base station, carrier information from the UE, where the carrier information indicates a carrier requested by the UE for use, the carrier information includes first information, the first information is used to indicate a type of a service corresponding to at least some of the carrier requested by the UE for use, the carrier requested by the UE for use includes a carrier other than all carriers used by the base station; and sending, by the base station, indication information to the UE based on the carrier aggregation capability information and the carrier information, where the indication information is used to indicate allowing the UE to use one or more of the carrier requested by the UE for use.

18 Claims, 9 Drawing Sheets

(51) Int. Cl.
  *H04W 28/06*  (2009.01)
  *H04W 72/04*  (2009.01)
  *H04W 4/46*   (2018.01)
  *H04W 76/15*  (2018.01)
  *H04W 8/24*   (2009.01)
  *H04W 24/10*  (2009.01)
  *H04W 92/18*  (2009.01)
  *H04W 4/70*   (2018.01)

(52) U.S. Cl.
  CPC ..... *H04W 72/048* (2013.01); *H04W 72/0453* (2013.01); *H04W 76/15* (2018.02); *H04W 4/70* (2018.02); *H04W 92/18* (2013.01)

(58) Field of Classification Search
  CPC ......... H04W 76/15; H04W 8/24; H04W 4/70; H04W 92/18; H04L 5/0058
  USPC .......................................... 370/329
  See application file for complete search history.

(56) References Cited

U.S. PATENT DOCUMENTS

| | | | | |
|---|---|---|---|---|
| 2012/0155671 A1* | 6/2012 | Suzuki | ............... | H04M 9/08 381/77 |
| 2012/0157143 A1* | 6/2012 | Tsunekawa | ........... | H04W 72/06 455/509 |
| 2015/0103779 A1* | 4/2015 | Ma | ........................ | H04L 5/0053 370/329 |
| 2016/0037526 A1* | 2/2016 | Kim | ........................ | H04L 5/001 370/329 |
| 2016/0037527 A1* | 2/2016 | Kim | ........................ | H04L 5/001 370/329 |
| 2016/0037528 A1* | 2/2016 | Kim | ........................ | H04L 5/001 370/329 |
| 2016/0323851 A1* | 11/2016 | Kim | ........................ | H04L 5/001 |
| 2018/0132216 A1* | 5/2018 | Kim | ........................ | H04L 5/001 |
| 2018/0242264 A1* | 8/2018 | Pelletier | ............... | H04W 52/146 |
| 2018/0317066 A1* | 11/2018 | Xu | ........................ | H04W 4/06 |
| 2019/0132717 A1* | 5/2019 | Xu | ........................ | H04W 76/10 |

FOREIGN PATENT DOCUMENTS

| | | |
|---|---|---|
| CN | 102611994 A | 7/2012 |
| CN | 105191179 A | 12/2015 |
| CN | 105264996 B | 3/2020 |
| WO | 2012062371 A1 | 5/2012 |

OTHER PUBLICATIONS

Extended European Search Report dated Mar. 21, 2019 in corresponding European Patent Application No. 16901335.6 (7 pages).
PCT International Search Report (Form PCT/ISA/210); dated Jan. 19, 2017 in corresponding PCT Application No. PCT/CN2016/082067 (4 pages).

* cited by examiner

US 11,006,317 B2

COMMUNICATION METHOD AND APPARATUS

CROSS-REFERENCE TO RELATED APPLICATIONS

This application is a continuation of International Application No. PCT/CN2016/082067, filed on May 13, 2016, the disclosure of which is hereby incorporated by reference in its entirety.

TECHNICAL FIELD

The present invention relates to the communications field, and in particular, to a communication method and an apparatus.

BACKGROUND

In a Long Term Evolution (LTE) communications technology, a method for reporting, by user equipment (UE), a carrier requested for use (namely, a carrier that is requested to be allocated to the UE) has been standardized. A base station notifies, by using a system broadcast, the UE of a downlink broadcast/multicast carrier list supported by a current cell. The UE may determine, from the carrier list, a carrier requested for use, and report the carrier requested for use to the base station. The base station configures a corresponding carrier for the UE based on a carrier aggregation capability of the UE and the carrier that is reported and is requested for use. In an actual application, an Internet of Vehicles service (for example, a vehicle-to-everything V2X service) is an important service related to vehicle security, and the service should be preferentially supported by the base station. However, in the prior art, the base station configures the carrier for the UE based on only the carrier aggregation capability of the UE and a capability of the base station itself. Therefore, use of a carrier corresponding to the V2X service by the UE may be affected, and communications efficiency of the V2X service may be affected.

SUMMARY

Embodiments of the present invention provide a communication method and an apparatus, to improve communications efficiency.

According to a first aspect, a communication method is provided, including: receiving, by a base station, carrier aggregation capability information from user equipment UE; receiving, by the base station, carrier information from the UE, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and sending, by the base station, indication information to the UE based on the carrier aggregation capability information and the carrier information, where the indication information is used to indicate allowing the UE to use one or more of the carrier requested by the UE for use.

The base station receives the first information sent by the UE, where the first information can indicate a type of a service corresponding to the carrier requested by the UE for use, and the carrier requested by the UE for use includes a carrier other than a carrier used by the base station, so that communications efficiency of a communications system is improved.

In a possible design, the base station notifies, through broadcast, the UE of an available carrier for transmitting the service, where the carrier for transmitting the service is obtained by the base station from information that is sent by another base station to the base station, and the information includes a carrier that is used by the another base station for transmitting the service.

In a possible design, the first information is carried in configuration information of each of the carrier requested by the UE for use.

In a possible design, the carrier aggregation capability information includes second information and third information, the second information is used to indicate a frequency band or a frequency band combination supported by the UE, and the third information is used to indicate that the frequency band or the frequency band combination supported by the UE includes a carrier that is expected to be used by the UE for transmitting the service.

In a possible design, the base station configures a measurement task for the UE, where the measurement task is used to instruct the UE to determine a carrier corresponding to the service from the frequency band or the frequency band combination supported by the UE.

In a possible design, the carrier aggregation capability information includes fourth information, and the fourth information indicates whether the UE is capable of simultaneously using, in the frequency band or the frequency band combination supported by the UE, carriers corresponding to at least two of the following three link types: a base station-to-terminal link, a D2D link, and a V2X link.

In a possible design, the carrier aggregation capability information further includes a minimum carrier spacing that is allowed between any two of links of the following types: the base station-to-terminal link, the D2D link, and the V2X link.

In a possible design, the first information includes at least one of the following identifiers: an operator identifier corresponding to each of the carrier requested by the UE for use, a cell identifier corresponding to each of the carrier requested by the UE for use, and a broadcast group identifier corresponding to each of the carrier requested by the UE for use.

In a possible design, the communication method further includes: sending, by the base station, a handover command to the UE, where the handover command is used to instruct the UE to hand over from the base station to a target base station, the handover command includes fifth information, the fifth information is used to indicate a carrier that is available on the target base station for the UE, and the carrier that is available on the target base station for the UE includes a carrier other than a carrier used by the target base station.

According to a second aspect, a communication method is provided, including: sending, by user equipment UE, carrier aggregation capability information to a base station; sending, by the UE, carrier information to the base station, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and receiving, by the UE, indication information that is sent by the base station based on the carrier aggregation capability information and the carrier information, where the indication information is used to indicate allowing the UE to use one or more of the carrier requested by the UE for use.

In a possible design, before the sending, by the UE, carrier information to the base station, the communication method further includes: receiving, by the UE, a broadcast of the base station, where the broadcast is used to notify the UE of an available carrier for transmitting the service, the carrier for transmitting the service is obtained by the base station from information that is sent by another base station to the base station, and the information includes a carrier that is used by the another base station for transmitting the service.

In a possible design, the first information is carried in configuration information of each of the carrier requested by the UE for use.

In a possible design, the carrier aggregation capability information includes second information and third information, the second information is used to indicate a frequency band or a frequency band combination supported by the UE, and the third information is used to indicate that the frequency band or the frequency band combination supported by the UE includes a carrier that is expected to be used by the UE for transmitting the service.

In a possible design, the communication method further includes: executing, by the UE, a measurement task configured by the base station, where the measurement task is used to instruct the UE to determine a carrier corresponding to the service from the frequency band or the frequency band combination supported by the UE.

In a possible design, the carrier aggregation capability information includes fourth information, and the fourth information indicates whether the UE is capable of simultaneously using, in the frequency band or the frequency band combination supported by the UE, carriers corresponding to at least two of the following three link types: a base station-to-terminal link, a D2D link, and a V2X link.

In a possible design, the carrier aggregation capability information further includes a minimum carrier spacing that is allowed between any two of links of the following types: the base station-to-terminal link, the D2D link, and the V2X link.

In a possible design, the first information includes at least one of the following identifiers: an operator identifier corresponding to each of the carrier requested by the UE for use, a cell identifier corresponding to each of the carrier requested by the UE for use, and a broadcast group identifier corresponding to each of the carrier requested by the UE for use.

In a possible design, the communication method further includes: receiving, by the UE, a handover command from the base station, where the handover command is used to instruct the UE to hand over from the base station to a target base station, the handover command includes fifth information, the fifth information is used to indicate a carrier that is available on the target base station for the UE, and the carrier that is available on the target base station for the UE includes a carrier other than a carrier used by the target base station.

According to a third aspect, a base station is provided, where the base station includes modules for performing the method in the first aspect.

According to a fourth aspect, UE is provided, where the UE includes modules for performing the method in the second aspect.

According to a fifth aspect, a base station is provided, where the base station includes a memory, a processor, and a transceiver. The memory is configured to store a program, the processor is configured to execute the program, and the transceiver is configured to communicate with another station. When the program is executed, the processor is configured to perform the method in the first aspect.

According to a sixth aspect, UE is provided, where the UE includes a memory, a processor, and a transceiver. The memory is configured to store a program, the processor is configured to execute the program, and the transceiver is configured to communicate with another station. When the program is executed, the processor is configured to perform the method in the second aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the present invention may be applied to various communications systems, such as: a Global System for Mobile Communications (GSM), a Code Division Multiple Access (CDMA) system, a Wideband Code Division Multiple Access (WCDMA), a general packet radio service (GPRS), and a Long Term Evolution (LTE).

It should also be understood that, in the embodiments of the present invention, user equipment (UE) may be referred to as a terminal, a mobile station (MS), a mobile terminal, or the like. The user equipment may communicate with one or more core networks through a radio access network (RAN). For example, the user equipment may be a mobile phone (also referred to as a "cellular phone") or a computer with a mobile terminal. For example, the user equipment may alternatively be a portable, pocket-sized, handheld, computer built-in, or in-vehicle mobile apparatus, which exchanges voice and/or data with the radio access network.

It should be understood that, in the embodiments of the present invention, the user equipment may be short for in-vehicle information, in-vehicle communication, or an in-vehicle entertainment product installed in a vehicle (and is also referred to as a vehicle machine). For functions, the user equipment needs to implement information communication of services such as vehicle to vehicle (V2V), vehicle to pedestrian (V2P), and vehicle to infrastructure (V2I), and these services are collectively referred to as a V2X service. The V2X service in the embodiments of the present invention includes a V2V service, a V2I service, and a vehicle to pedestrian V2P service.

It should be understood that, in the embodiments of the present invention, a base station may be a base transceiver station (BTS) in GSM or CDMA, or a NodeB in WCDMA, or an evolved NodeB (eNB or e-NodeB) in LTE, or a base station (5G (5th Generation) new radio (NR) base station) in a future evolved technology, and the present invention imposes no limitation.

Figure 1:
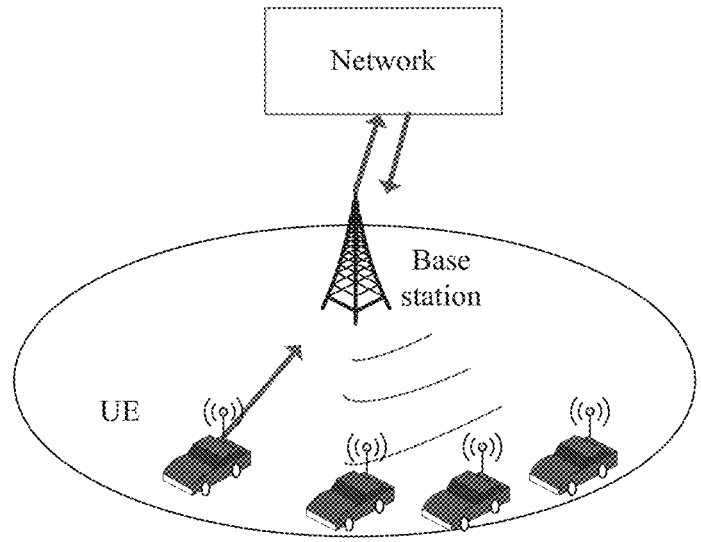
FIG. 1 is a schematic diagram of a possible system architecture according to an embodiment of the present invention.

FIG. 1 is a schematic diagram of an application scenario of the Internet of Vehicles according to an embodiment of the present invention. In the application scenario in FIG. 1, UE may send Internet of Vehicles data to a network in a unicast manner, the network sends the Internet of Vehicles data to a base station, and the base station sends the Internet of Vehicles data to all vehicles around a transmit end by using a broadcasting technology. In this communications manner, communication is performed by using an interface (that is, a Uu interface) between the UE and the base station.

Figure 2:
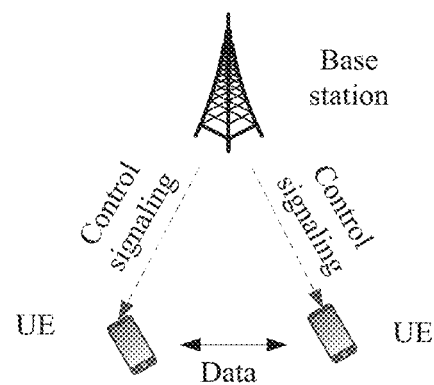
FIG. 2 is a schematic diagram of a possible system architecture according to an embodiment of the present invention.

FIG. 2 is a schematic diagram of another application scenario of the Internet of Vehicles according to an embodiment of the present invention. FIG. 2 shows a communications scenario of a device-to-device (D2D) technology. In the application scenario in FIG. 2, a base station may perform resource configuration, scheduling, coordination, and the like, to assist in communication between terminals. In the 3rd Generation Partnership Project (3GPP) Release (Release, Rel)-14, an enhanced V2X link (including a V2V link, a V2I link, or a V2P link) based on a D2D link is defined. Communication on the D2D link and the V2X link may be performed by using different interfaces.

In the 3GPP Rel-13 standard, UE supports reporting of reception capabilities of the UE in all frequency bands or all carrier aggregation on a Uu link (for example, the UE may report the reception capabilities to a base station by using signaling supportedbandcombination (supported band combination) in an LTE system), reception capabilities of different noncontiguous carriers in each frequency band, and a capability of simultaneous transmission (or reception) of a Uu link and a D2D link on different carriers in each carrier aggregation. Further, the UE may further report whether the UE has a reception capability on a broadcast/multicast carrier on a Uu link, or whether the UE has a reception capability on a component carrier that is not configured by the base station. However, the UE cannot notify the base station of carrier aggregation in which the UE has a D2D link or V2X link aggregated transmission or reception capability.

In the prior art, the base station notifies, by using a system broadcast, the UE of a downlink broadcast/multicast carrier list (for example, a system information block (SIB) 15 in the LTE system) supported by a current cell. The UE may determine, from the carrier list, a carrier that is requested by the UE for use and that is corresponding to a V2X service, and report the carrier requested for use to the base station. The base station determines, based on a carrier aggregation capability reported by the UE and the carrier that is reported and is requested for use, whether to configure a corresponding carrier in a frequency band corresponding to V2X that is requested by the UE for use, to perform unicast transmission. In an actual application, an Internet of Vehicles service is an important service related to vehicle security, and the service should be preferentially supported by the base station. However, when reporting the carrier requested for use, the UE does not report a service type corresponding to the carrier requested for use. When configuring the carrier for the UE, the base station does not know which type of service the carrier requested by the UE for use is corresponding to, and determines, based on another factor such as resource utilization, whether to configure the carrier requested for use for the UE, to receive a corresponding service, or configure a frequency band corresponding to the carrier for the UE, to perform another unicast service (for example, in situation 1, the UE reports aggregation of a frequency band B1, and reports a V2X carrier requested for use on a carrier f1 in a frequency band B2, but the base station configures another carrier f2 in B1 as a unicast carrier; and in situation 2, the UE reports supporting a frequency band B1 and supporting a frequency band B2 but not supporting aggregated reception of the frequency bands B1 and B2, and the UE reports a V2X carrier requested for use in B2, but the base station configures a carrier in the frequency band B1). Therefore, the UE cannot receive the carrier corresponding to the V2X service, and user experience is affected.

Based on this, the present invention provides a communication method. The communication method cannot only be applied to the application scenario in FIG. 1, but also be applied to the application scenario in FIG. 2. A main concept of the communication method is: A base station receives carrier information sent by UE, where the carrier information indicates a carrier requested by the UE for use, the carrier requested for use includes a carrier other than all carriers used by the base station, the carrier information includes first information, the first information is used to indicate a type of a service corresponding to the carrier, and the carrier requested by the UE for use includes a carrier other than a carrier used by the base station. Therefore, the base station can allocate a carrier based on the service type, and can allocate a carrier other than the carrier used by the base station, so that communications efficiency of a communications system is improved.

The carrier requested by the UE for use includes a carrier requested by the UE for reception and/or a carrier requested by the UE for transmission.

For example, after receiving the first information, the base station may determine that the carrier requested by the UE for use is a carrier corresponding to a V2X service, and determine, based on a priority of the V2X service, whether to configure the carrier for the UE to receive the V2X service (for example, a unicast carrier of another service may not be configured any more on a carrier related to the carrier, to ensure that the UE can receive the V2X service corresponding to the carrier, and this includes situation 1 and situation 2 described above), so as to ensure that the UE receives the carrier corresponding to the V2X service. In this embodiment of the present invention, the base station allocates the carrier to the UE when considering the service type corresponding to the carrier, so that communications efficiency of the communications system is improved.

In addition, the present invention further provides a communication method. The communication method cannot only be applied to the application scenario in FIG. 1, but also be applied to the application scenario in FIG. 2. A main concept of the communication method is: A base station may receive information that is sent by another base station than the base station, where the information is used to indicate a service type corresponding to a carrier configured by the another base station. The base station determines, based on the service type corresponding to the carrier supported by the another base station and a service type corresponding to a carrier supported by the base station itself, a service type corresponding to a carrier requested by UE for use, so as to allocate a carrier to the UE based on the service type corresponding to the carrier, so that communications efficiency of a communications system is improved. Similarly, the base station sends, to another surrounding base station, a list of carriers that are used by the base station itself and are used for transmitting a particular type of service.

In addition, for UE that uses a V2X link to perform V2X service communication and that is in an idle state, when the UE enters a cell, and when the UE receives a broadcast message sent by a base station and knows that the current base station cannot transmit downlink data by using a broadcast or multicast technology, a terminal needs to enter a connected state, and establishes a connection to an Internet of Vehicles server (V2X application server), to notify the Internet of Vehicles server of a cell identifier of the UE, and the Internet of Vehicles server can send corresponding V2X service data to the UE by using a downlink unicast channel.

Figure 3:
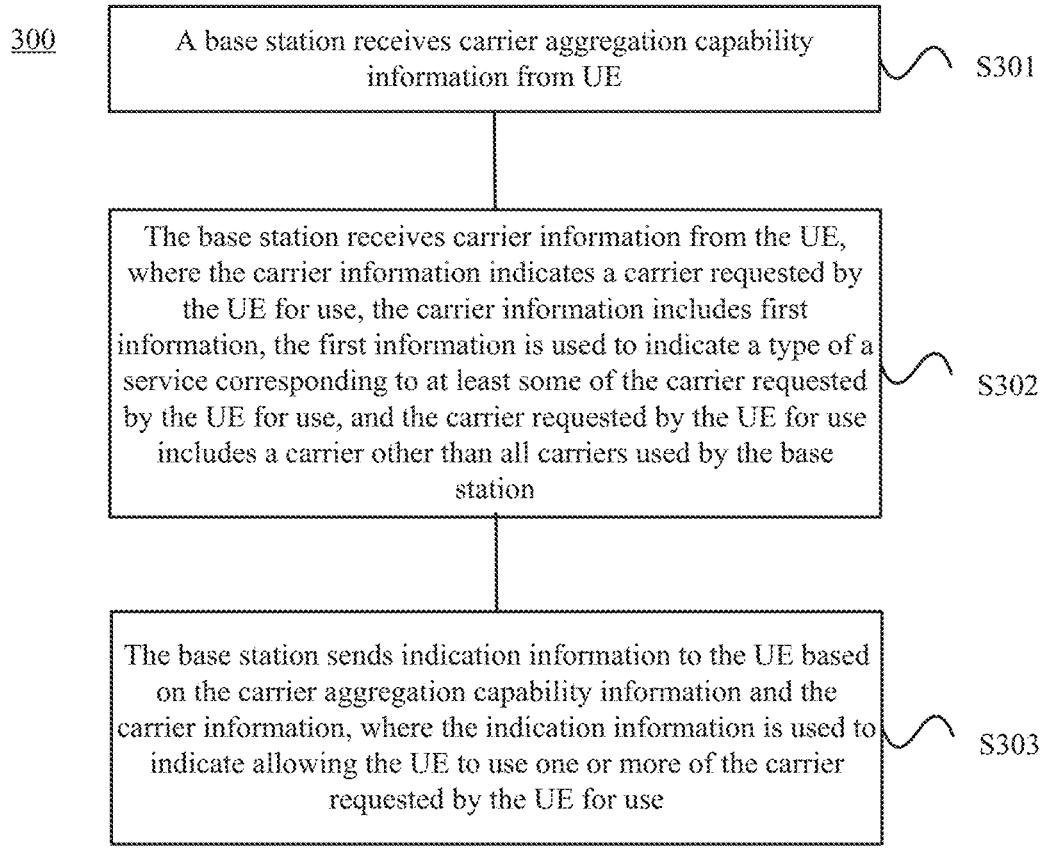
FIG. 3 is a schematic diagram of a communication method according to another embodiment of the present invention.

With reference to FIG. 3, the following describes a solution provided in an embodiment of the present invention. FIG. 3 shows a communication method 300 provided in this embodiment of the present invention. As shown in FIG. 3, the method 300 includes the following steps.

S301. A base station receives carrier aggregation capability information from user equipment UE.

Optionally, the carrier aggregation capability information may indicate carrier aggregation capabilities of at least two of the following links: a base station-to-terminal link (Uu link), a D2D link, or a V2X link. Specifically, the carrier aggregation capability information may specifically include a frequency band or a frequency band combination available for the UE, and may further include fourth information. The fourth information may indicate a capability of sending or receiving carriers on at least two links by using all simultaneously available frequency band sets in the frequency band or the frequency band combination available for the UE, or a capability of receiving or sending carriers on at least two links by using different noncontiguous carriers in each available frequency band or frequency band set.

For example, the UE may alternatively report, to the base station by using the following signaling, a capability, of the UE, of simultaneously supporting the Uu link, the D2D link, or the V2X link, where Uu, D2D, and V2X below respectively represent the Uu link, the D2D link, and the V2X link:

the UE supports simultaneous reception of D2D and V2X, and signaling simultaneousRX_D2D_V2X may be used;

the UE supports simultaneous transmission of D2D and V2X, and signaling simultaneousTX_D2D_V2X may be used;

the UE supports simultaneous reception of Uu and V2X, and signaling simultaneousRX_Uu_V2X may be used;

the UE supports simultaneous transmission of Uu and V2X, and signaling simultaneousTX_Uu_V2X may be used;

the UE supports simultaneous reception of Uu, D2D, and V2X, and signaling simultaneousRX_Uu_D2D_V2X may be used; and the UE supports simultaneous transmission of Uu, D2D, and V2X, and signaling simultaneousTX_Uu_D2D_V2X may be used.

Optionally, the carrier aggregation capability information may include a capability that is of the UE on a broadcast/multicast carrier and that is of receiving the service on a carrier other than all carriers used by the base station.

In addition, the carrier aggregation capability information may further include a minimum carrier spacing that is allowed between any two carriers of a carrier corresponding to the Uu link, a carrier corresponding to the D2D link, and a carrier corresponding to the V2X link. For example, when the UE supports simultaneous reception or transmission of different types of links in a same frequency band, a minimum carrier spacing for simultaneous reception or transmission of the Uu link and the D2D link may be 40 MHz, and a minimum carrier spacing for simultaneous reception or transmission of the D2D link and the V2X link may be 20 MHz.

S302. The base station receives carrier information from the UE, where the carrier information indicates a carrier requested for use, the carrier information includes first information, the first information is used to indicate a type of a service corresponding to at least some of the carrier requested by the UE for use, and the carrier requested by the UE for use includes a carrier other than all carriers used by the base station.

Optionally, the carrier may not be limited to a range of the carriers used by the base station. In other words, the UE may report, to the base station, a carrier that is not used by the base station, and indicate a service type corresponding to the carrier. In a subsequent step, the base station may instruct the UE to receive a service on the carrier that is not used by the base station. For example, a list of the carrier may include at least one carrier used by another base station than the base station, and the base station may send an indication command to the UE, where the indication command is used to indicate allowing the UE to receive a carrier in the at least one carrier. Optionally, the service may include a V2X service, or another service type may be indicated. Therefore, the UE can transmit a service by using a carrier other than the carrier of the base station, so that communications efficiency is improved.

The following describes, by using an example in which a service type is the V2X service, the method provided in this embodiment of the present invention. A person skilled in the art may understand that using the example of the V2X service is only intended for enabling a person skilled in the art to understand this embodiment of the present invention, other than limiting this embodiment of the present invention to a specific scenario that is used as an example. Obviously, a person skilled in the art may make various equivalent modifications or variations based on the examples provided in the present invention. This embodiment of the present invention is intended to cover the modifications or variations.

The carrier information may be a carrier list that is reported by the UE to the base station and that is requested for use. For example, the carrier list may be broadcast/multicast service interest indication (MBMSInterestIndication) signaling, and the first information may be a corresponding information element (IE) on each carrier in the signaling. (For example, an IE of a temporary mobile group identity (TMGI) list is added to each carrier frequency in a broadcast carrier frequency list (mbms-FreqList) in LTE, to indicate a service type corresponding to a carrier frequency requested for use). Alternatively, the carrier list may be new signaling, for example, may be signaling similar to D2D link user equipment information (SidelinkUEInformation). When the service type of the carrier frequency requested for use is the V2X service, the first information may be V2X user equipment information (V2XUEInformation) carried in the signaling SidelinkUEInformation.

Optionally, the first information may include an operator identifier corresponding to each carrier of the at least some of the carrier requested by the UE for use, a cell identifier corresponding to each carrier of the at least some of the carrier requested by the UE for use, and/or a mobile group identity corresponding to each carrier of the at least some of the carrier requested by the UE for use. In addition, the operator identifier may be, for example, a public land mobile network (PLMN) identifier (ID) in an LTE system.

Optionally, when a frequency band of a carrier that is requested by the UE for use and that is corresponding to the V2X service is occupied by another carrier configured by the base station, and the UE cannot search for, based on a carrier aggregation capability, a surrounding V2X carrier on the frequency band of the carrier that is requested for use and that is corresponding to the V2X service, before step S302, the base station may configure a measurement task for the UE, to instruct the UE to determine, by executing the measurement task, a carrier corresponding to the service.

In an example, the carrier aggregation capability information may include second information and third information. The second information is used to indicate a frequency band or a frequency band combination supported by the UE, and the third information is used to indicate that the frequency band or the frequency band combination supported by the UE includes a carrier that is expected to be used by the UE for transmitting the service.

In the prior art, the UE may not know a carrier corresponding to a service, but know only a frequency band or a frequency band combination of the carrier corresponding to the service. When the frequency band that is requested by the UE for use and that is corresponding to the service is occupied by a carrier configured by the base station, the UE cannot search for the service on the frequency band of the carrier that is requested for use and that is corresponding to the service.

In this embodiment of the present invention, the UE reports, in the second information included in the carrier aggregation capability information, the frequency band or the frequency band combination supported by the UE, and the carrier aggregation capability information may further include the third information. The base station may configure a measurement task (or a measurement object) for the UE, and each measurement task is used to instruct the UE to search each carrier in the frequency band or the frequency band combination indicated in the third information for the carrier corresponding to the service. The measurement task may be periodic. That is, a timer is configured, and when the UE finds at least one carrier corresponding to the service before the timer expires, the UE may indicate, to the base station in the first information of the carrier information, that the carrier corresponding to the service is found, to request the base station to allocate the carrier. The measurement task may alternatively be triggered by an event, and finishes when the UE finds a carrier frequency corresponding to the service (for example, a carrier frequency corresponding to the V2X service). Optionally, the measurement task may be configuring a frequency band rather than a frequency for the UE. When the base station configures a measurement task in a frequency band, when executing the measurement task, the UE may perform measurement on carriers in the frequency band one by one, to determine whether there is a service requested for use.

The measurement task may include one or more of the following information: a measurement carrier serial number, a measurement timer, and a resource position (for example, a measurement gap in the LTE system) occupied for measurement.

Optionally, the method 300 further includes the following step:

S303. The base station sends indication information to the UE based on the carrier aggregation capability information and the carrier information, where the indication information is used to indicate allowing the UE to use one or more of the carrier requested by the UE for use.

Optionally, the carrier may be a carrier used by another base station than the base station. The base station and the another base station may belong to a same operator or different operators. Carrier ranges used by the base station and the another base station are different (for example, carrier ranges authorized for different base stations may be different). The base station obtains, from information exchange between the another base station and the base station, the carrier used by the another base station. In this embodiment of the present invention, the base station may instruct the UE to receive a carrier that is not used by the base station, so that a time that the UE finds a carrier corresponding to a service (for example, the V2X service) supported by the another base station is shortened.

For example, after determining that the carrier is the carrier corresponding to the V2X service, when allocating a carrier to the UE, the base station may preferentially consider the carrier corresponding to the V2X service. For example, when a carrier f1 in a frequency band is corresponding to the V2X service, and a carrier f2 is corresponding to another service, the base station may configure the carrier f1 corresponding to the V2X service for the UE but not configure the carrier f2 corresponding to another service, to ensure communication quality of the V2X service.

For example, the indication information may carry at least one of the following information: a carrier list that can be received by the UE, a PLMN list that can be received by the UE, a cell list that can be received by the UE, and a mobile group list that can be received by the UE.

For example, when allocating a carrier to the UE, the base station may configure the carrier corresponding to the V2X service for the UE, (for example, in the LTE system, SCellToAddMod is used for indication), to instruct the UE to receive the V2X service on the carrier. A difference from the prior art is that the configured carrier corresponding to the received V2X service may not belong to carriers of the base station. Further, the configuration herein may not include normal carrier configuration (such as timing advance), and is only used to notify the UE that the V2X service can be received on the carrier. Optionally, the configuration command may include a V2X service identifier, or a new signaling format is used.

The base station not only obtains, from the carrier information, a service type corresponding to the carrier requested by the UE for use, but also may determine the service type corresponding to the carrier in another manner. For example, the base station may notify, through broadcast, the UE of an available carrier for transmitting the service, where the carrier for transmitting the service is obtained by the base station from information that is sent by another base station to the base station, and the information includes a carrier that is used by the another base station for transmitting the service.

Optionally, the base station may obtain a service type of a carrier supported by the base station itself, and the base station may further receive information from another base station, where the information is used to indicate a service type (for example, the V2X service) corresponding to a carrier supported by the another base station. The base station may determine, based on the service type of the carrier supported by the base station itself and the service type of the carrier supported by the another base station, the service type corresponding to the carrier requested by the UE for use, so as to allocate the carrier to the UE based on the service type of the carrier and the carrier aggregation capability information. Specifically, the base station may receive a supported carrier list and an indication message that are sent by another base station than the base station, where the base station and the another base station may be corresponding to a same operator or different operators. In this case, the base station may notify, by using broadcast signaling, UE in a cell of the corresponding supported carrier list and a service type (for example, a SIB15 in the LTE system) corresponding to a supported carrier, where the carrier list may not include the carrier used by the base station. After receiving the information of the carrier requested for use, the UE uses signaling to notify the base station that the UE requests to use the carrier corresponding to the V2X service. Similarly, the base station may also send sixth information to the another base station, where the sixth information is used to indicate a service type corresponding to a carrier supported by the base station.

For example, the base station may pre-store a carrier list of carriers corresponding to V2X services of all operators that cover a current base station position, or the base station may obtain a carrier list of carriers corresponding to V2X services from the UE or base stations of all operators that cover a current base station position, so as to determine that the carrier is the carrier corresponding to the V2X service. A carrier list of the another base station may be obtained by using a network management system (OAM), or interface (for example, an X2 interface in LTE) signaling between base stations, or signaling (for example, an RIM (RAN Information manager) message in the LTE system) between base stations.

Optionally, the method 300 may further include the following steps:

S304. The base station adds an indication to sent broadcast signaling (for example, a SIB18 or a SIB21 in LTE), to indicate that downlink V2X service data can be transmitted only in a unicast manner in a current cell.

S305. When the UE uses a V2X link (for example, a Rel-14 V2X link in an LTE system) to receive and send a V2X service, and the UE is in an idle state (for example, an RRC_IDLE state in the LTE system), and when the UE enters a new cell through cell reselection, and receives the indication that is sent by the base station in step S304 and that indicates that the downlink V2X service data can be transmitted only in the unicast manner in the current cell, the UE enters a connected state (for example, an RRC_CONNECTED state in the LTE system), and establishes a connection to an Internet of Vehicles application server, to report an ID of the cell in which the UE is located.

S304 and S305 may be or may not be based on other steps in the method 300.

Optionally, the method 300 further includes the following step:

S306. The base station sends a handover command to the UE, where the handover command is used to instruct the UE to hand over from the base station to a target base station, the handover command may include fifth information, the fifth information is used to indicate a carrier that is available on the target base station for the UE, and the carrier that is available on the target base station for the UE includes a carrier other than a carrier used by the target base station.

For example, the foregoing handover command may be handover command information.

Optionally, after the base station determines a V2X carrier list received by the UE, when the UE performs cell handover, information about the V2X carrier list may be carried in handover preparation information, to instruct the target base station of the handover to configure the corresponding carrier list for the UE, carriers in the carrier list may include a carrier other than the carrier used by the target base station, and the UE receives V2X information on these carriers in a cell obtained after the handover.

In this embodiment of the present invention, when the UE is handed over from the base station to the target base station, the base station may instruct the UE to configure the carrier other than the carrier used by the target base station (namely, a carrier that does not belong to the target base station), so that communications efficiency of a communications system is improved.

In this embodiment of the present invention, the base station allocates the carrier to the UE when considering the service type corresponding to the carrier, so that communications efficiency of the communications system is improved.

The following further describes the solutions of the embodiments of the present invention with reference to more accompanying drawings.

Figure 4:
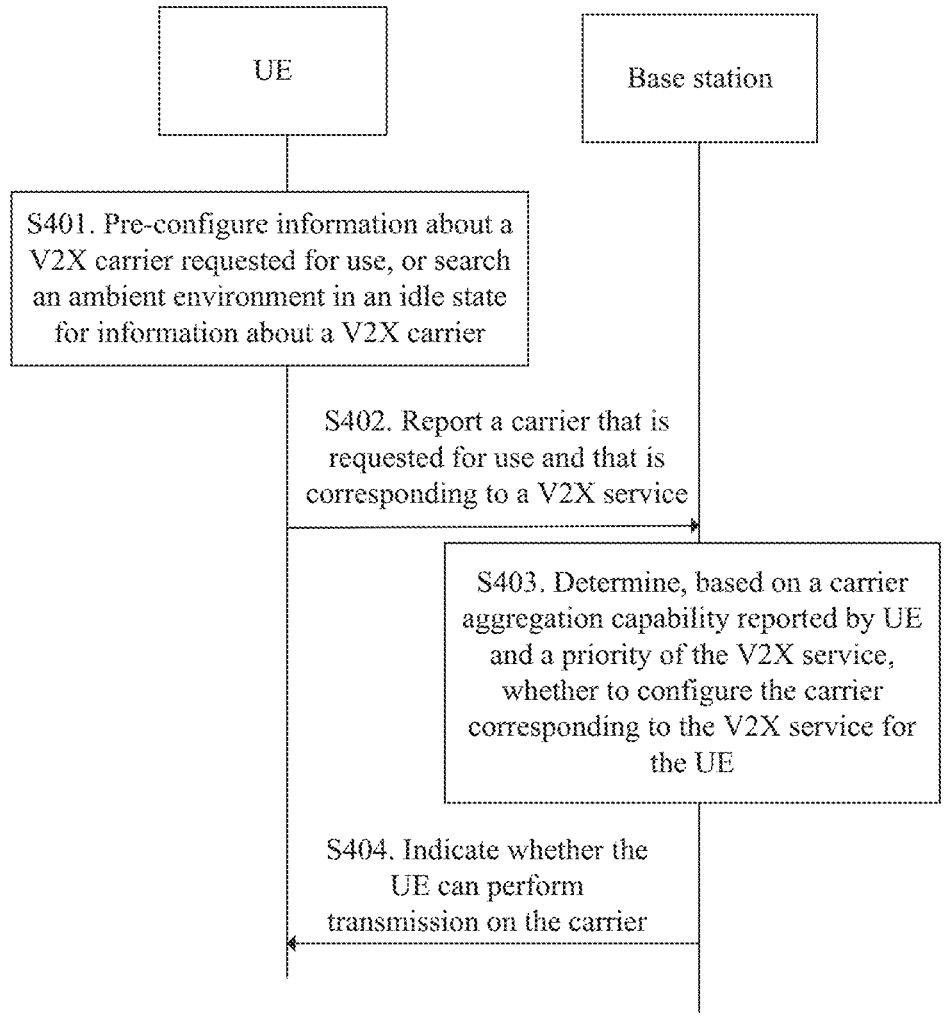
FIG. 4 is a schematic diagram of a communication method according to another embodiment of the present invention.

FIG. 4 shows another communication method provided in an embodiment of the present invention. The method may be applied to a communications system that is based on a Uu link, a D2D link, or a V2X link. In methods in FIG. 4 to FIG. 8, it is assumed that a service type corresponding to a carrier is a V2X service, and description is provided based on this example. As shown in FIG. 4, the communication method includes the following steps.

S401. UE pre-stores a V2X carrier list that is requested for use, where the V2X carrier list may be pre-configured by the UE, or may include one or more carriers that are corresponding to a V2X service and that are previously read by the UE when a receiver of the UE is in an idle state.

S402. The UE reports a carrier aggregation capability of the UE, and reports a carrier that is requested for use and that is corresponding to the V2X service to a base station.

For example, the UE may report the carrier that is requested for use and that is corresponding to the V2X service to the base station by using the following solutions.

Solution 1: An IE is added to original carrier report information, where the IE may indicate that the reported carrier is corresponding to a V2X service type. For example, that the reported carrier is corresponding to the V2X service is indicated in a multimedia broadcast/multicast service mbms-service instruction in signaling MBMSInterestIndication of an LTE system.

Solution 2: A new IE is used on each carrier in original carrier report information. For example, the IE carries V2X service information. For example, signaling MBMSInterestIndication in an LTE system carries an mbms-FreqList-V2X identifier, to indicate that the reported carrier is corresponding to the V2X service.

Solution 3: New signaling is introduced, to report the carrier that is requested by the UE for use and that is corresponding to the V2X service. For example, information similar to SidelinkUEInformation may be used in an LTE system to report the carrier that is requested for use and that is corresponding to the V2X service, and V2XUEInformation is introduced to SidelinkUEInformation to indicate that the reported carrier is corresponding to the V2X service.

In the signaling, optionally, an operator identifier, a cell identifier, or a temporary mobile group identity of each V2X carrier requested for use may be reported, and the reported carrier list may be carried in downlink broadcast signaling (for example, a SIB15 in the LTE) sent by a serving base station, or may be pre-configured by the UE.

S403. The base station configures, for the UE based on the carrier aggregation capability of the UE and a priority of the V2X service, the carrier requested for use.

Optionally, the base station may allocate a carrier to the UE based on a condition of preferentially configuring the carrier corresponding to the V2X service for the UE. For example, for UE that does not support a plurality of receivers, the base station may configure only a V2X carrier on a frequency band of the V2X carrier without allocating a carrier corresponding to another service, to ensure that the UE receives the V2X service.

S404. The base station may indicate, by using dedicated signaling, that the UE can receive the V2X service on the V2X carrier list requested for use.

Optionally, the dedicated signaling may be existing carrier configuration information, and the dedicated signaling may indicate only that the UE can receive the V2X service on the carrier. A corresponding reception parameter may not be configured, and the UE may obtain the reception parameter from a corresponding carrier.

In this embodiment of the present invention, when reporting the carrier list requested to be allocated, the UE may add indication information to the reported carrier list, where the indication information is used to indicate that the carrier requested to be allocated to the UE is the carrier corresponding to the V2X service. When allocating a carrier to the UE, the base station may consider the priority of the V2X service based on the indication information, so that reception of the V2X service is ensured, and communications efficiency is improved.

Figure 5:
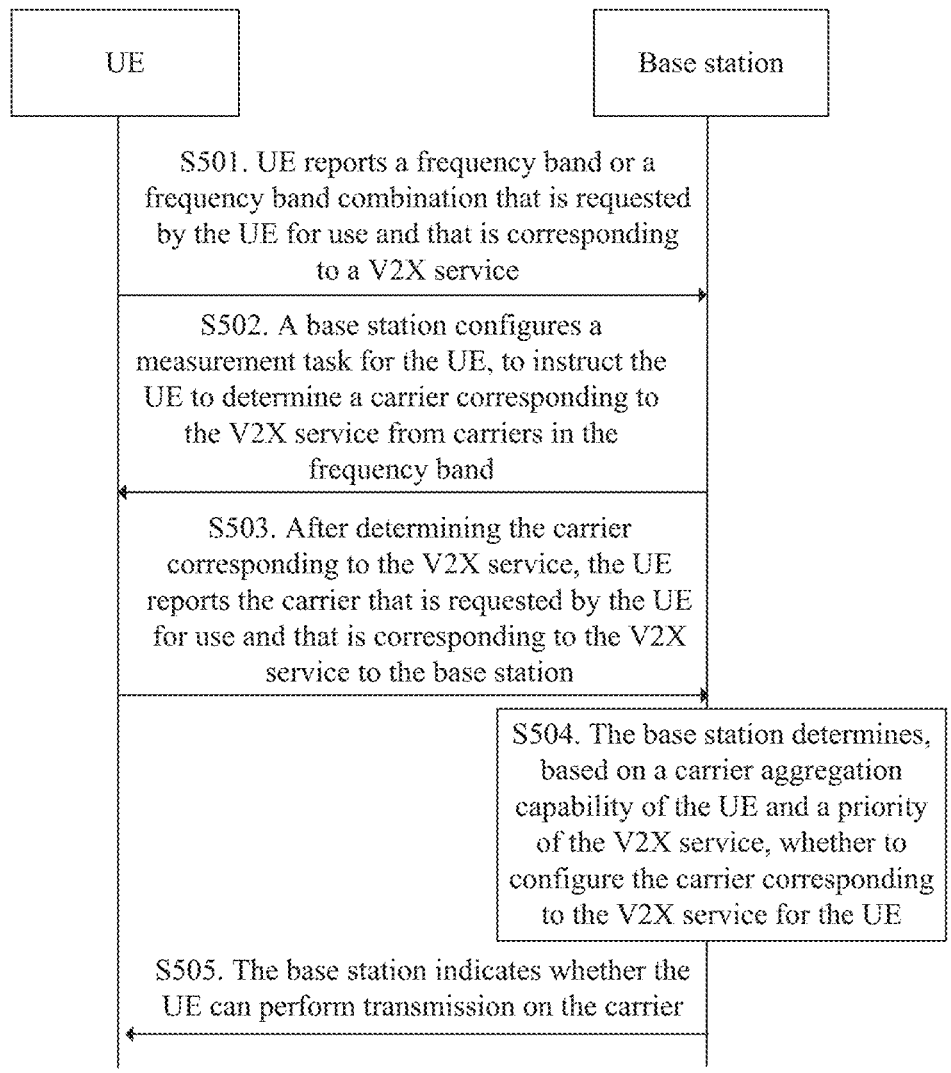
FIG. 5 is a schematic diagram of a communication method according to another embodiment of the present invention.

FIG. 5 shows another communication method provided in an embodiment of the present invention. The method may be applied to a communications system that is based on a Uu link, a D2D link, or a V2X link. In the method shown in FIG. 5, UE does not know whether a carrier requested to be configured and received is corresponding to a V2X service, and knows only which frequency band or carrier aggregation supports a V2X service. The communication method includes the following steps.

S501. UE sends carrier aggregation capability information to a base station, where the carrier aggregation capability information includes a frequency band or a carrier set that is requested by the UE for use and that is corresponding to V2X. A dedicated identifier is added to indicate that the reported frequency band includes a carrier corresponding to a V2X service. For example, in an LTE system, the UE may send supportedbandcombination information to the base station, and adds a dedicated identifier to the information, to indicate a frequency band or carrier aggregation including a V2X carrier. Refer to S301 for a specific explanation of the carrier aggregation capability information.

Optionally, a piece of new dedicated signaling may be used to carry a list of frequency bands that is requested by the UE for use and that is corresponding to V2X.

S502. The base station configures a measurement task for each carrier in the frequency band that is requested by the UE for use and that is corresponding to the V2X service, where the measurement task may be used to measure a carrier of a corresponding frequency band. When executing the measurement task, the UE searches for system broadcast information sent by a surrounding base station, to determine whether a V2X service is transmitted on a carrier corresponding to the measurement task. The measurement task may instruct the UE to perform periodic measurement on a carrier, and the base station may configure a timer for the UE. After the timer expires, if the UE does not report a carrier that is requested for use and that is corresponding to a V2X service, the base station may consider that this measurement fails.

In this step, even if the UE uses a carrier corresponding to another service in a frequency band of the V2X carrier, the UE may also use the measurement task configured by the base station, to detect whether the V2X service can be received on one or more carriers in the frequency band, and report, to the base station in a timely manner, one or more measured carriers on which the V2X service needs to be received, so that the base station allocates the carrier corresponding to the V2X service, thereby ensuring reception of the V2X service and improving communications efficiency.

Optionally, for the measurement task, the UE may be configured to perform measurement in one frequency band, and the UE may perform measurement on all carriers one by one in the frequency band, and report all carriers that are obtained through measurement in the frequency band and that have a V2X service.

S503. After receiving the measurement task, the UE performs measurement in a corresponding frequency band. When a specific carrier that is configured and measured includes a V2X carrier requested for use, the V2X carrier requested for use may be reported to the base station. A reporting method may be similar to S402 in the method in FIG. 4 (for example, signaling MBMSInterestIndication may be used), and details are not described herein again.

S504 and S505 are similar to S403 and S404 in the method in FIG. 4, and details are not described herein again.

S506. The base station allocates a carrier that is in the frequency band and that is corresponding to the V2X service to the UE. This step is the same as step S305.

Optionally, if the base station configures, in the frequency band corresponding to the V2X carrier that is reported by the UE and is requested for use, a carrier used for a Uu link of another service, the base station may de-activate the carrier corresponding to the another service. In this embodiment of the present invention, the UE may not need to pre-configure a broadcast/multicast carrier requested for use, but measure, in a communication process, a frequency band in which a V2X service may exist, to determine a carrier on which a V2X service needs to be received. In this way, when considering a priority of the V2X service, the base station may configure a component carrier of another service in the frequency band when the V2X service is not used, so that system resource utilization is improved.

Figure 6:
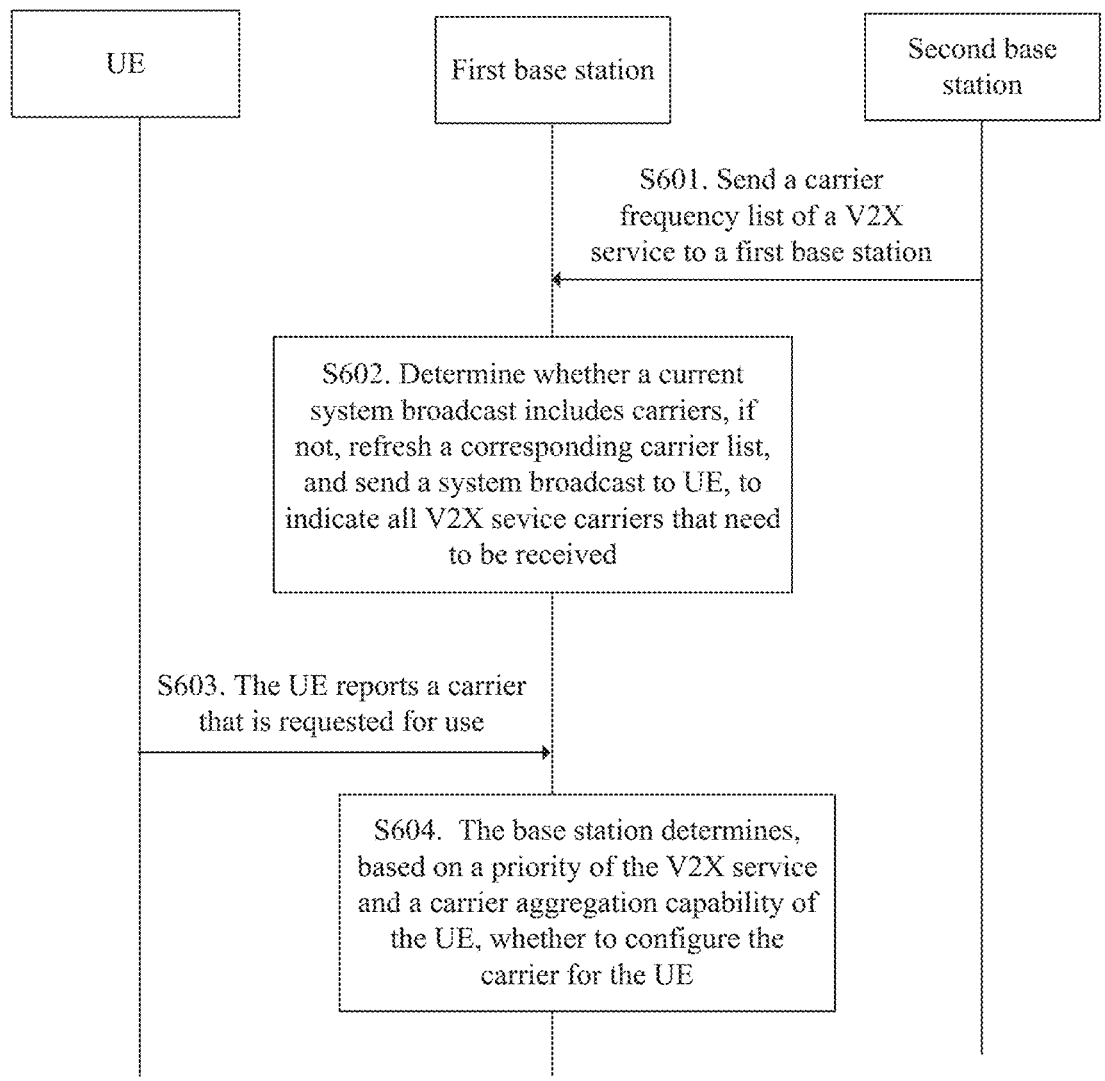
FIG. 6 is a schematic diagram of a communication method according to another embodiment of the present invention.

FIG. 6 shows another communication method provided in an embodiment of the present invention. The method may be applied to a communications system that is based on a Uu link, a D2D link, or a V2X link. The communication method in FIG. 6 includes the following steps.

S601. A first base station receives a carrier list that is used by another base station (for example, a second base station) for transmitting a V2X service. Optionally, the carrier list carries a V2X service identifier, to indicate a carrier list corresponding to the V2X service. Optionally, the V2X service identifier may include a PLMN identifier of an operator to which the second base station belongs, a cell identifier, or a broadcast session identifier.

Similarly, the first base station may also send, to the another base station, a carrier list that is used by the first base station and that is corresponding to a V2X service, and add a V2X service identifier to the carrier list, to notify the another base station of a carrier corresponding to the V2X service supported by the first base station.

S602. After receiving the carrier list that is sent by the second base station and that supports the V2X service, the first base station may update a V2X carrier list in a system broadcast corresponding to the first base station, for example, add a carrier that is previously unavailable, or delete a carrier that is previously supported but not supported now. Optionally, the V2X service identifier may be carried in the carrier list in the broadcast. For example, the V2X service identifier may be added by using the following solutions.

Solution 1: An IE is added to original system broadcast information, to indicate that a carrier that can be supported is corresponding to a V2X service type. For example, a V2X indication may be added to broadcast service neighboring cell carrier identifier (MBMS-SAI-InterFreq-r11) signaling in SIB15 information in an LTE system.

Solution 2: Original system broadcast information is used to instruct each carrier to use a new IE, to indicate that the carrier is corresponding to a V2X service. For example, a broadcast service neighboring cell V2X carrier identifier (MBMS-SAI-InterFreq-r11-V2X) information element is carried in SIB15 information in an LTE system.

Solution 3: New signaling is introduced, to broadcast a carrier that is supported by a base station and that is corresponding to a V2X service. For example, in an LTE system, a dedicated system message SIB21 in the Internet of Vehicles may be used, and carriers broadcast in the system message all support a V2X service. The new signaling may include an operator identifier, a cell identifier, or a mobile group identity of a V2X carrier supported by the base station.

It should be understood that in this step, the carrier that is broadcast by the base station and that supports a service is not limited to a carrier supported by the base station itself, and may further include a carrier supported by the another base station. Therefore, when configuring, for UE, the carrier corresponding to the service supported by the base station, the base station may simultaneously consider configuring, for the UE, the carrier supported by the another base station, so that communications efficiency is improved.

Optionally, step S602 may alternatively be independent of step S601. That is, it may be assumed that the first base station has known all V2X carriers that the UE needs to receive, and does not need to obtain, from the another base station, a carrier that is supported by the another base station and that is corresponding to the V2X service. In addition, the system broadcast includes information about the carrier list that can be supported and that is corresponding to the V2X service.

S603. After receiving the supported V2X carrier list broadcast by the base station in S602, UE may report, based on the supported V2X carrier list, a carrier that is requested for use and that is corresponding to the V2X service. Optionally, in this step, because the base station has determined the carrier corresponding to the V2X service, the UE may report only the carrier requested by the UE for use, without reporting a service type corresponding to the carrier requested by the UE for use.

S604. After receiving the carrier that is reported by the UE and is requested for use and that is corresponding to the V2X service, the base station may allocate a carrier to the UE based on a carrier aggregation capability of the UE and a priority of the V2X service.

A specific process of steps S603 and S604 in FIG. 6 is the same or similar to corresponding content in FIG. 3 to FIG. 5, and details are not described herein again.

In this embodiment of the present invention, the base station has learned a carrier corresponding to the V2X service of the another base station, and notifies the UE of the carrier by using broadcast signaling, so that a time that the UE searches for a V2X carrier of the another base station is reduced.

Figure 7:
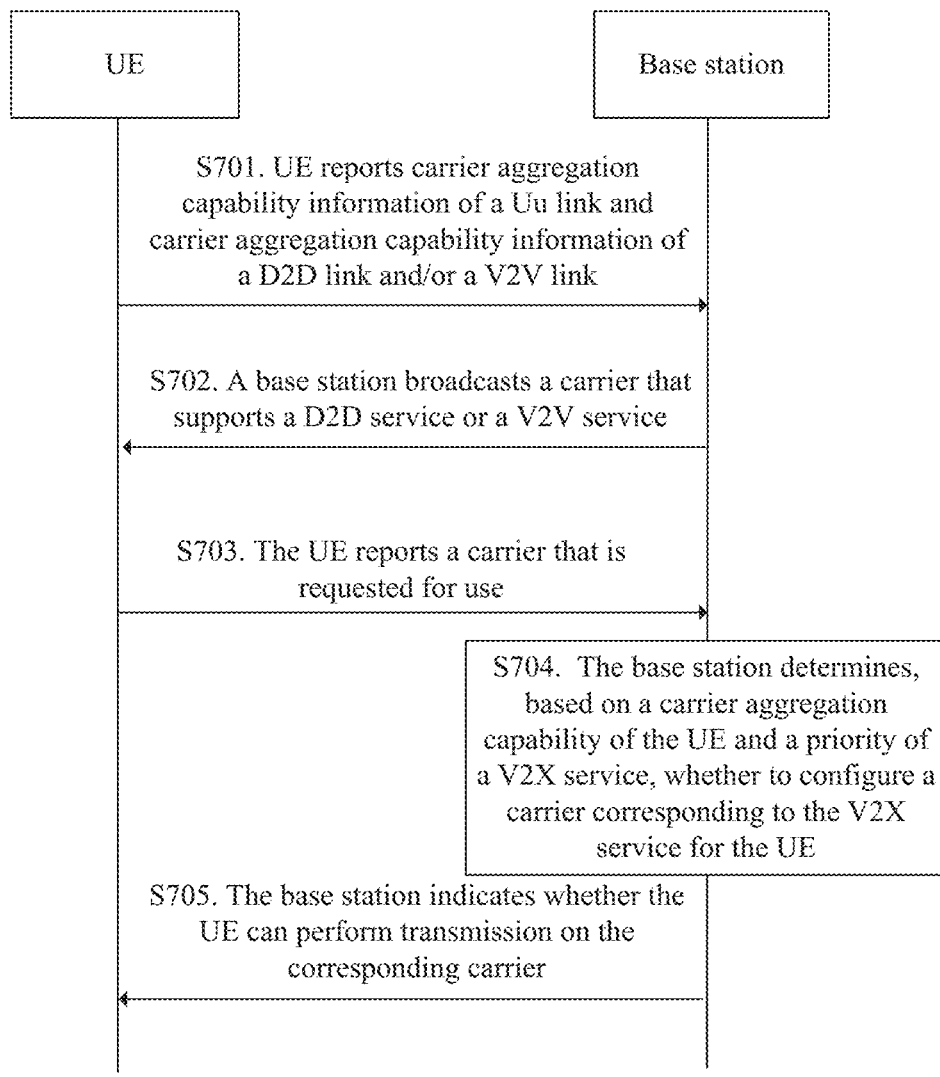
FIG. 7 is a schematic diagram of a communication method according to another embodiment of the present invention.

FIG. 7 shows another communication method provided in an embodiment of the present invention. The method may be applied to a communications system that is based on a Uu link, a D2D link, or a V2X link. The communication method shown in FIG. 7 includes the following steps.

S701. UE reports carrier aggregation capability information to a base station, where the carrier aggregation capability information includes a carrier aggregation capability of the UE on a Uu link and carrier aggregation capabilities of the UE on a D2D link and a V2X link.

When data is transmitted by using the D2D direct link, V2X carriers on different V2X links are configured between a plurality of operators. The base station can directly send a V2X service on a supported V2X link or D2D link. In this case, the UE may perform transmission or reception on the V2X link or the D2D link in a carrier aggregation manner. In this case, the UE may send, to the base station, the carrier aggregation capabilities of the UE on the D2D link and the V2X link. The base station may determine, based on the carrier aggregation capabilities of the UE, and priorities of a V2V service and a D2D service, whether to allocate a carrier to the UE. For example, it may be assumed that the priority of the V2V service is higher than that of the D2D service, and the base station may preferentially consider allocating a carrier to the V2X link.

S702. The base station broadcasts, by using a system message, a carrier that supports a D2D service or a V2V service. (For example, a SIB18, a SIB19, or a SIB21 in an LTE system may be used for broadcasting). The UE sends, to the UE based on uplink dedicated signaling, a carrier that is requested by the UE for use and that is corresponding to the D2D service or the V2V service.

For example, in the LTE system, the UE may send, to the base station by using signaling SidelinkUEInfomation, the carrier that is requested for use and that is corresponding to the D2D or V2V service.

S703. The UE reports, to the base station, a carrier list requested for use.

S704. The base station determines that the carrier reported by the UE is a carrier corresponding to a V2X service.

S705. The base station determines, based on the carrier aggregation capabilities of the UE, whether to allocate the carrier to the UE.

Optionally, the UE may send or receive the V2X service on a carrier of the D2D link or the V2X link. Therefore, when the base station indicates that the UE performs V2X communication on the carrier, the base station may further indicate whether the UE sends or receives the V2X service on a specific D2D or V2V carrier.

A specific process of steps S703 to S705 is the same or similar to corresponding content in FIG. 3 to FIG. 6, and details are not described herein again.

In this embodiment of the present invention, the carrier aggregation capability information reported by the UE may include the carrier aggregation capabilities on the D2D link and the V2X link, and the base station may determine, based on the carrier aggregation capabilities reported by the UE and the V2X carrier requested by the UE for use, to allocate the carrier corresponding to the V2X service to the UE.

Figure 8:
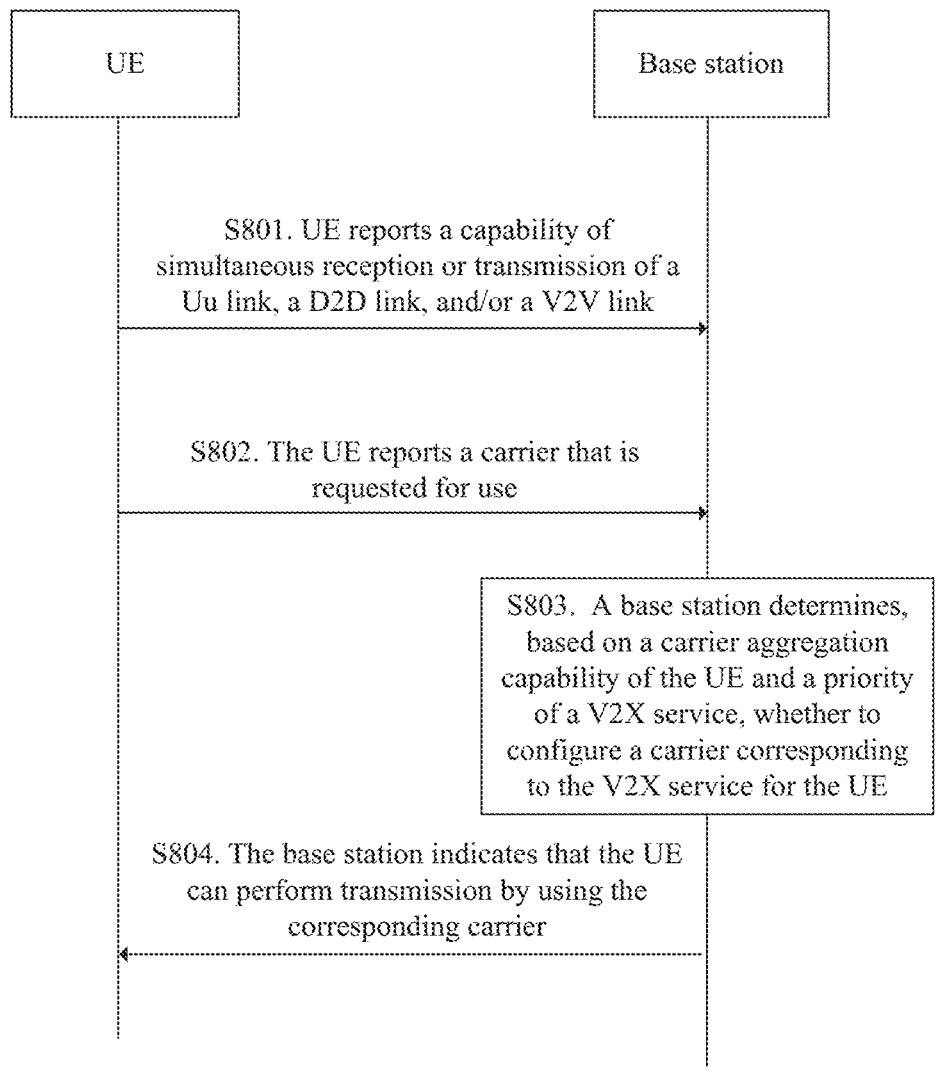
FIG. 8 is a schematic diagram of a communication method according to another embodiment of the present invention.

FIG. 8 shows another communication method provided in an embodiment of the present invention. The method may be applied to a communications system that is based on a Uu link, a D2D link, or a V2X link. In the method shown in FIG. 8, when the Uu link, the D2D link, and the V2X link simultaneously exist in a system, UE needs to report which carrier has a carrier aggregation capability of simultaneously supporting reception and transmission of the D2D link, the V2X link, or the Uu link, and the base station configures a corresponding frequency band for the UE based on the capability. The communication method includes the following steps.

S801. UE sends, to a base station, a capability, of the UE, of supporting simultaneous transmission or reception of a V2X link, a D2D link or a Uu link in each carrier aggregation capability. For example, the UE may have a capability of reception or transmission of a V2X link and a Uu link in a same frequency band, or the UE may have a capability of reception or transmission of a D2D link and a V2X link in a same frequency band.

For example, the UE may alternatively report, to the base station by using the following signaling, the capability, of the UE, of simultaneously supporting the Uu link, the D2D link, or the V2X link, where Uu, D2D, and V2X below respectively represent the Uu link, the D2D link, and the V2X link:

the UE supports simultaneous reception of D2D and V2X, and signaling simultaneousRX_D2D_V2X may be used;

the UE supports simultaneous transmission of D2D and V2X, and signaling simultaneousTX_D2D_V2X may be used;

the UE supports simultaneous reception of Uu and V2X, and signaling simultaneousRX_Uu_V2X may be used;

the UE supports simultaneous transmission of Uu and V2X, and signaling simultaneousTX_Uu_V2X may be used;

the UE supports simultaneous reception of Uu, D2D, and V2X, and signaling simultaneousRX_Uu_D2D_V2X may be used; and the UE supports simultaneous transmission of Uu, D2D, and V2X, and signaling simultaneousTX_Uu_D2D_V2X may be used.

The capability that is reported by the UE and that is of simultaneous transmission or reception may be a capability indication carried in each carrier aggregation capability (for example, supportedbandcombination in LTE). The capability indication specifically indicates a capability of simultaneous transmission or reception of different types of links supported in each carrier aggregation capability. Alternatively, the capability indication information may be carried in a general radio frequency parameter (such as an RFparameter in an LTE system) of a terminal.

Optionally, the UE may add, to reported carrier aggregation capability information, a carrier spacing that is supported by carriers corresponding to any two of the foregoing three links during simultaneous reception or transmission. For example, a minimum carrier spacing for simultaneous reception or transmission of the Uu link and the D2D link may be 40 MHz, and a minimum carrier spacing for simultaneous reception or transmission of the D2D link and the V2X link may be 20 MHz.

S802. When the UE has, on a specific carrier of a Uu interface, a V2X carrier requested for use, the UE may notify, by using dedicated signaling, the base station of carrier information of the V2X carrier requested for use, or may report that the UE has, on a specific carrier of the D2D and V2X links, the V2X carrier requested for use.

S803. The base station may determine, based on the capability that is received in S801 and that is, of the UE, of simultaneous reception or transmission of the Uu link, the D2D link, or the V2X link in combination with the carrier that is reported in S802 and that is requested for use on the Uu link, the V2X link, or the D2D link, whether to send, to the UE, an indication of allowing receiving or sending the V2X service on a carrier of the Uu link, V2X link, or the D2D link.

In this embodiment of the present invention, the base station may determine, based on carrier aggregation capabilities of the D2D link, V2X link, and the Uu link, to allocate the carrier corresponding to the V2X service to the UE, so that V2X service transmission efficiency is improved.

The foregoing describes in detail the communication methods in the embodiments of the present invention with reference to FIG. 1 to FIG. 8, and the following describes base stations and UEs in embodiments of the present invention with reference to FIG. 9 to FIG. 12.

Figure 9:
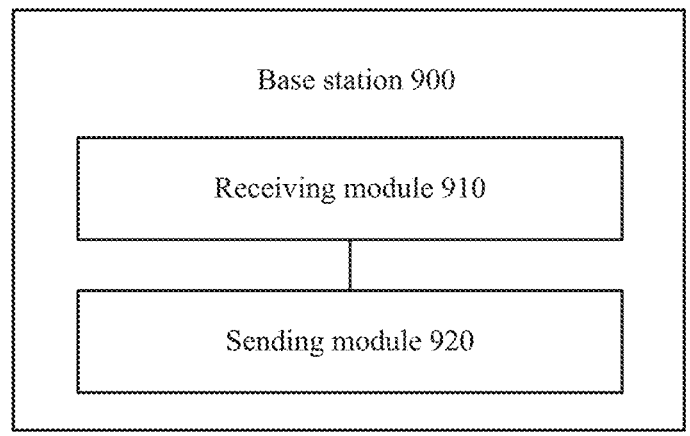
FIG. 9 is a schematic structural diagram of a base station according to an embodiment of the present invention.

FIG. 9 is a schematic diagram of a base station 900 according to an embodiment of the present invention. It should be understood that the base station 900 in FIG. 9 can perform the steps performed by the base station in the preceding description. For brevity, repeated descriptions are omitted appropriately. The base station 900 includes:

a receiving module 910, configured to receive carrier aggregation capability information from UE, where the receiving module 910 is further configured to receive carrier information from the UE, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and a sending module 920, configured to send indication information to the UE based on the carrier aggregation capability information and the carrier information, where the indication information is used to indicate allowing the UE to use one or more of the carrier requested by the UE for use.

In this embodiment of the present invention, the base station receives the first information sent by the UE, where the first information can indicate a type of a service corresponding to the carrier requested by the UE for use, and the carrier requested by the UE for use includes a carrier other than a carrier used by the base station, so that communications efficiency of a communications system is improved.

Figure 10:
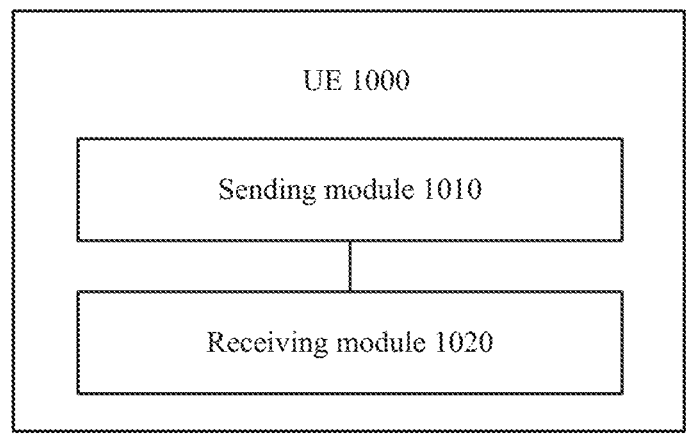
FIG. 10 is a schematic structural diagram of UE according to an embodiment of the present invention.

FIG. 10 is a schematic diagram of UE 1000 according to an embodiment of the present invention. It should be understood that the UE 1000 in FIG. 10 can perform the steps performed by the UE in the preceding description. For brevity, repeated descriptions are omitted appropriately. The UE 900 includes:

a sending module 1010, configured to send carrier aggregation capability information to a base station, where the sending module 1010 is further configured to send carrier information to the base station, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and a receiving module 1020, configured to receive indication information that is sent by the base station based on the carrier aggregation capability information and the carrier information, where the indication information is used to indicate allowing the UE to use one or more of the carrier requested by the UE for use.

In this embodiment of the present invention, the base station receives the first information sent by the UE, where the first information can indicate a type of a service corresponding to the carrier requested by the UE for use, and the carrier requested by the UE for use includes a carrier other than a carrier used by the base station, so that communications efficiency of a communications system is improved.

Figure 11:
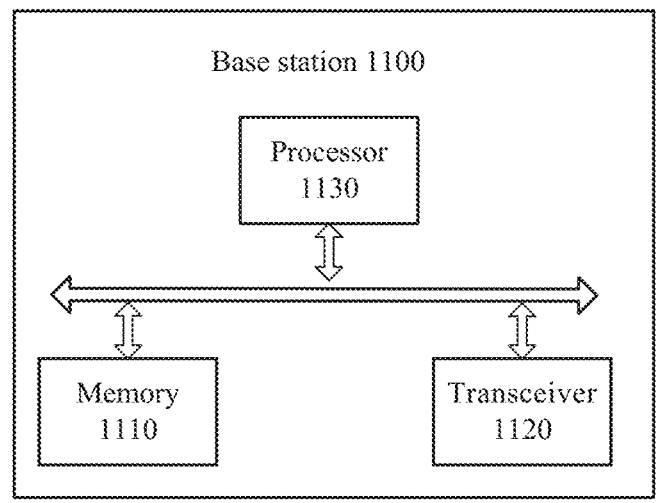
FIG. 11 is a schematic diagram of a base station according to another embodiment of the present invention.

FIG. 11 is a schematic diagram of a base station 1100 according to an embodiment of the present invention. It should be understood that the base station 1100 in FIG. 11 can perform the steps performed by the base station in the preceding description. For brevity, repeated descriptions are omitted appropriately. The base station 1100 includes:

a memory 1110, configured to store a program;

a transceiver 1120; and a processor 1130, configured to execute the program in the memory 1110, where when the program is executed, the processor 1130 is configured to control the transceiver 1120 to receive carrier aggregation capability information from user equipment UE; receive carrier information from the UE, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and send indication information to the UE based on the carrier aggregation capability information and the carrier information, where the indication information is used to indicate allowing the UE to use one or more of the carrier requested by the UE for use.

In this embodiment of the present invention, the base station receives the first information sent by the UE, where the first information can indicate a type of a service corresponding to the carrier requested by the UE for use, and the carrier requested by the UE for use includes a carrier other than a carrier used by the base station, so that communications efficiency of a communications system is improved.

Figure 12:
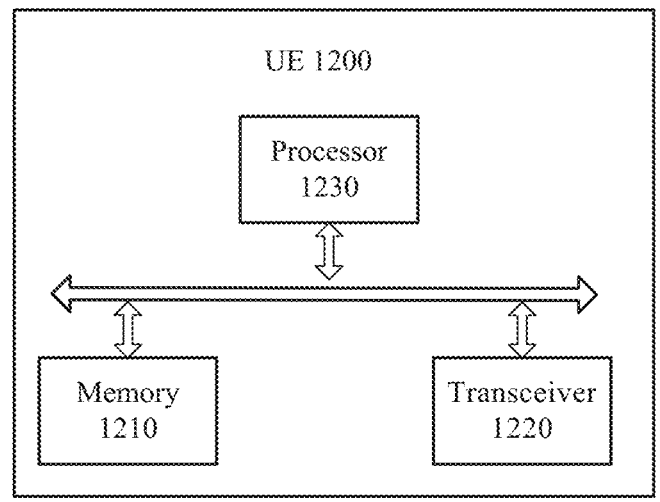
FIG. 12 is a schematic diagram of UE according to another embodiment of the present invention.

FIG. 12 is a schematic diagram of UE 1200 according to an embodiment of the present invention. It should be understood that the UE 1200 in FIG. 12 can perform the steps performed by the UE in the preceding description. For brevity, repeated descriptions are omitted appropriately. The UE 1200 includes:

a memory 1210, configured to store a program;

a transceiver 1220; and a processor 1230, configured to execute the program in the memory 1210, where when the program is executed, the processor 1230 is configured to control the transceiver 1220 to send carrier aggregation capability information to a base station; send carrier information to the base station, where the carrier information indicates a carrier requested by the UE for use, the carrier information includes first information, the first information is used to indicate a type of a service corresponding to at least some of the carrier requested by the UE for use, and the carrier requested by the UE for use includes a carrier other than all carriers used by the base station; and receive indication information that is sent by the base station based on the carrier aggregation capability information and the carrier information, where the indication information is used to indicate allowing the UE to use one or more of the carrier requested by the UE for use.

In this embodiment of the present invention, the base station receives the first information sent by the UE, where the first information can indicate a type of a service corresponding to the carrier requested by the UE for use, and the carrier requested by the UE for use includes a carrier other than a carrier used by the base station, so that communications efficiency of a communications system is improved.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined based on A. However, it should further be understood that determining B based on A does not mean that B is determined based on A only; that is, B may also be determined based on A and/or other information.

A person of ordinary skill in the art may be aware that, the units and steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communications connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

To make the application document brief and clear, technical features and descriptions in one of the foregoing embodiments may be considered to be applicable to other embodiments, and details are not described in the other embodiments.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    receiving, by a first base station, carrier aggregation capability information from user equipment (UE);
    receiving, by the first base station, carrier information from the UE, wherein the carrier information indicates a carrier requested by the UE for use, and comprises first information that indicates a type of a service corresponding to at least a portion of the carrier requested by the UE for use, and wherein the carrier requested by the UE for use is a carrier used by a second base station, wherein the carrier requested by the UE for use corresponds to a frequency band indicated by the carrier aggregation capability information received from the UE;
    configuring, by the first base station, the carrier for the type of service in the frequency band; and
    determining, by the first base station, that one or more carriers can be configured for other types of services in the frequency band; and
    sending, by the first base station, indication information to the UE based on the carrier aggregation capability information and the carrier information, wherein the indication information is to notify the UE that the type of the service is to be received on the carrier requested by the UE for use.

2. The communication method according to claim 1, wherein before receiving, by the first base station, the carrier information from the UE, the communication method further comprises:
    notifying, by the first base station through broadcast, the UE of an available carrier for transmitting the service, wherein the carrier for transmitting the service is obtained by the first base station from information that is sent by the second base station to the first base station, and the information comprises the carrier that is used by the second base station for transmitting the service.

3. The communication method according to claim 1, wherein the first information is carried in configuration information of each of the carrier requested by the UE for use.

4. The communication method according to claim 1, wherein the carrier aggregation capability information comprises second information and third information, the second information is used to indicate the frequency band or a frequency band combination supported by the UE, and the third information is used to indicate that the frequency band or the frequency band combination supported by the UE comprises a carrier that is expected to be used by the UE for transmitting the service.

5. The communication method according to claim 4, wherein the communication method further comprises:
    configuring, by the first base station, a measurement task for the UE, wherein the measurement task is used to instruct the UE to determine a carrier corresponding to the service from the frequency band or the frequency band combination supported by the UE.

6. The communication method according to claim 1, wherein the carrier aggregation capability information comprises fourth information, and the fourth information indicates whether the UE is capable of simultaneously using, in the frequency band or the frequency band combination supported by the UE, carriers corresponding to at least two of the following three link types: a base station-to-terminal link, a D2D link, and a V2X link.

7. The communication method according to claim 6, wherein the carrier aggregation capability information further comprises a minimum carrier spacing that is allowed between any two of links of the following types: the base station-to-terminal link, the D2D link, and the V2X link.

8. A communication method, comprising:
    sending, by user equipment (UE), carrier aggregation capability information to a first base station;
    sending, by the UE, carrier information to the first base station, wherein the carrier information indicates a carrier requested by the UE for use, and comprises first information that indicates a type of a service corresponding to at least a portion of the carrier requested by the UE for use, and wherein the carrier requested by the UE for use is a carrier used by a second base station, wherein the carrier requested by the UE for use corresponds to a frequency band indicated by the carrier aggregation capability information received from the UE, wherein the firs base station configures the carrier for the type of service in the frequency band, and determines that one or more carriers can be configured for other types of services in the frequency band; and receiving, by the UE, indication information that is sent by the first base station based on the carrier aggregation capability information and the carrier information, wherein the indication information is to notify the UE that the type of the service is to be received on the carrier requested by the UE for use in the frequency band.

9. The communication method according to claim 8, wherein before sending, by the UE, the carrier information to the first base station, the communication method further comprises:

receiving, by the UE, a broadcast of the first base station, wherein the broadcast is used to notify the UE of an available carrier for transmitting the service, the carrier for transmitting the service is obtained by the first base station from information that is sent by the second base station to the first base station, and the information comprises the carrier that is used by the second base station for transmitting the service.

10. The communication method according to claim 8, wherein the first information is carried in configuration information of each of the carrier requested by the UE for use.

11. The communication method according to claim 8, wherein the carrier aggregation capability information comprises second information and third information, the second information is used to indicate the frequency band or a frequency band combination supported by the UE, and the third information is used to indicate that the frequency band or the frequency band combination supported by the UE comprises a carrier that is expected to be used by the UE for transmitting the service.

12. The communication method according to claim 11, wherein the communication method further comprises:

executing, by the UE, a measurement task configured by the first base station, wherein the measurement task is used to instruct the UE to determine a carrier corresponding to the service from the frequency band or the frequency band combination supported by the UE.

13. The communication method according to claim 8, wherein the carrier aggregation capability information comprises fourth information, and the fourth information indicates whether the UE is capable of simultaneously using, in the frequency band or the frequency band combination supported by the UE, carriers corresponding to at least two of the following three link types: a base station-to-terminal link, a D2D link, and a V2X link.

14. The communication method according to claim 13, wherein the carrier aggregation capability information further comprises a minimum carrier spacing that is allowed between any two of links of the following types: the base station-to-terminal link, the D2D link, and the V2X link.

15. User equipment (UE), comprising:

a sending module, configured to send carrier aggregation capability information to a first base station, wherein the sending module is further configured to send carrier information to the first base station, wherein the carrier information indicates a carrier requested by the UE for use, and comprises first information that indicates a type of a service corresponding to at least a portion of the carrier requested by the UE for use, and wherein the carrier requested by the UE for use is a carrier used by a second base station, wherein the carrier requested by the UE for use corresponds to a frequency band indicated by the carrier aggregation capability information received from the UE, wherein the firs base station configures the carrier for the type of service in the frequency band, and determines that one or more carriers can be configured for other types of services in the frequency band; and a receiving module, configured to receive indication information that is sent by the first base station based on the carrier aggregation capability information and the carrier information, wherein the indication information is to notify the UE that the type of the service is to be received on the carrier requested by the UE for use in the frequency band.

16. The UE according to claim 15, wherein before the UE sends the carrier information to the first base station, the receiving module is further configured to receive a broadcast of the first base station, wherein the broadcast is used to notify the UE of an available carrier for transmitting the service, the carrier for transmitting the service is obtained by the first base station from information that is sent by the second base station to the first base station, and the information comprises the carrier that is used by the second base station for transmitting the service.

17. The UE according to claim 15, wherein the first information is carried in configuration information of each of the carrier requested by the UE for use.

18. The UE according to claim 15, wherein the carrier aggregation capability information comprises second information and third information, the second information is used to indicate the frequency band or a frequency band combination supported by the UE, and the third information is used to indicate that the frequency band or the frequency band combination supported by the UE comprises a carrier that is expected to be used by the UE for transmitting the service.

* * * * *